United States Patent [19]

Arrigoni

[11] 4,454,656

[45] Jun. 19, 1984

[54] MINIMUM CHORD GAUGE

[75] Inventor: John P. Arrigoni, Wallingford, Conn.

[73] Assignee: United Technologies Corporation, Hartford, Conn.

[21] Appl. No.: 421,554

[22] Filed: Sep. 22, 1982

[51] Int. Cl.³ .......................... G01B 5/20; G01B 7/28
[52] U.S. Cl. ................................. 33/174 C; 33/174 L
[58] Field of Search ............ 33/174 C, 174 L, 174 R, 33/174 PA, 174 S

[56] References Cited

U.S. PATENT DOCUMENTS

| | | | |
|---|---|---|---|
| 3,023,506 | 3/1962 | Tandler et al. | 33/174 |
| 3,639,992 | 2/1972 | Dabrush et al. | 33/174 PA |
| 3,639,994 | 2/1972 | Palmenberg | 33/174 PA |
| 3,653,128 | 4/1972 | Palmenberg | 33/174 PA |
| 3,678,585 | 7/1972 | Dabrush et al. | 33/174 P |
| 3,778,906 | 12/1973 | Palmenberg | 33/174 P |
| 3,832,784 | 9/1974 | Samuels et al. | 33/174 C |
| 3,832,785 | 9/1974 | Miller | 33/174 C |
| 4,327,495 | 5/1982 | Plante | 33/174 C |
| 4,374,459 | 2/1983 | Burton | 33/174 C |

FOREIGN PATENT DOCUMENTS

| | | | |
|---|---|---|---|
| 645777 | 7/1962 | Canada . | |
| 112004 | 9/1964 | Czechoslovakia | 33/174 PA |
| 730983 | 1/1943 | Fed. Rep. of Germany | 33/174 C |
| 180345 | 4/1956 | Sweden | 33/174 PA |
| 981222 | 1/1965 | United Kingdom | 33/174 PA |

*Primary Examiner*—William D. Martin, Jr.
*Attorney, Agent, or Firm*—Robert C. Walker

[57] ABSTRACT

A gauge for measuring the chord length across an airfoil at a plurality of locations along the span is disclosed. Concepts ensuring accurate measurement notwithstanding deviations of the airfoil contour from design conditions are discussed. Floating gauge plates 46 locate the local position of the airfoil leading edge. A notch 58 in each plate marks the minimum acceptable chord length.

11 Claims, 4 Drawing Figures

MINIMUM CHORD GAUGE

DESCRIPTION

TECHNICAL FIELD

This invention relates to the measurement of airfoil minimum chord length, and more particularly to the measurement of chord length at intermediate points along the span to the airfoil.

The concepts were developed in the gas turbine engine industry for measuring the minimum acceptable chord length of used turbine blades to be prepared.

BACKGROUND ART

Airfoils of the type forming the blades and vanes of gas turbine engines are manufactured to rigidly designed specifications. Accurate geometric contour and size are essential to achieving aerodynamically efficient operation. Should an airfoil deviate from its design contour and chord length, adverse aerodynamic impact is likely to extend downstream into successive blade and vane stages.

Blades and vanes are among the most expensive of engine components to manufacture and among the most susceptible to wear. Blades and vanes within the turbine section are particularly susceptible to thermally induced damage, wear and abrasion. It is, therefore, that blades and vanes are commonly repaired or remanufactured after use to restore original dimensional characteristics to the engine without the expense of totally new components.

Blades and vanes for repair or remanufacture are carefully selected in a screening process to determine those components which are not so severely damaged that repair would be uneconomical. One critical measurement in the screening of airfoils is the airfoil chord length, the straight line distance between leading and trailing edges of the blade.

Many gauges are known in the art to be capable of measuring chord length. The accuracy and speed at which such gauges measure chord length varies. In general, known gauges such as those illustrated in U.S. Pat. No. 3,639,992 to Dabrush entitled "Chord Length Gauge" are suitable for use, but may have limitations where a straight line reference on the blade or vane is not available. The contour of a usual reference line, commonly the leading or trailing edge, may not have been a straight line as manufactured or may have become distorted in the hostile, high temperature engine environment.

Engine manufacturers and airfoil repairers, therefore, seek yet improved methods and apparatus for measuring chord length notwithstanding deviations of the measurement reference points from a straight line.

DISCLOSURE OF THE INVENTION

According to the present invention, a gauge for measuring minimum chord length at intermediate points along the span of an airfoil has a plurality of floating plates positionable at the leading edge of the airfoil at the sections to be measured and registerable against the leading edge for accurate measurement of the local chord length irrespective of deviations of the leading edge from the as manufactured conditions.

A primary feature of the present invention is the floating plates disposed along the length of the chord measuring gauge. Each of the floating plates is biased so as to register against the leading edge of the airfoil to be measured and to be rotatable thereabout against the trailing edge of the airfoil. Each plate floats in a plane which is perpendicular to the direction of span of the airfoil to be measured. A pin extending upwardly from the top edge of each floating plate forms a "V" stop into which the leading edge rests. "V" stops on one end plate and on a gauge plate which is rotatable in a plane parallel to the end plate establish a reference line which is perpendicular to the planes of the floating plates and is aligned with the direction of span of the airfoil. The points of engagement of the leading edge with the "V" stops of the floating plates occur in proximity with the reference line but are not necessarily coincident therewith. A notch on the top edge of each floating plate marks the minimum acceptable airfoil chord length. Engagement of the airfoil by any one of the notches indicates less than minimum chord length.

A principal advantage of the present invention is the ability of the gauge to determine minimum chord length irrespective of deviations in the leading edge positions from the as manufactured conditions. Accurate determination of minimum chord length can be made simultaneously at multiple sections along the span of the airfoil.

The foregoing and other objects, features and advantages of the present invention will become more apparent from the following description of preferred embodiments and accompanying drawings.

BEST MODE FOR CARRYING OUT THE INVENTION

Figure 1:
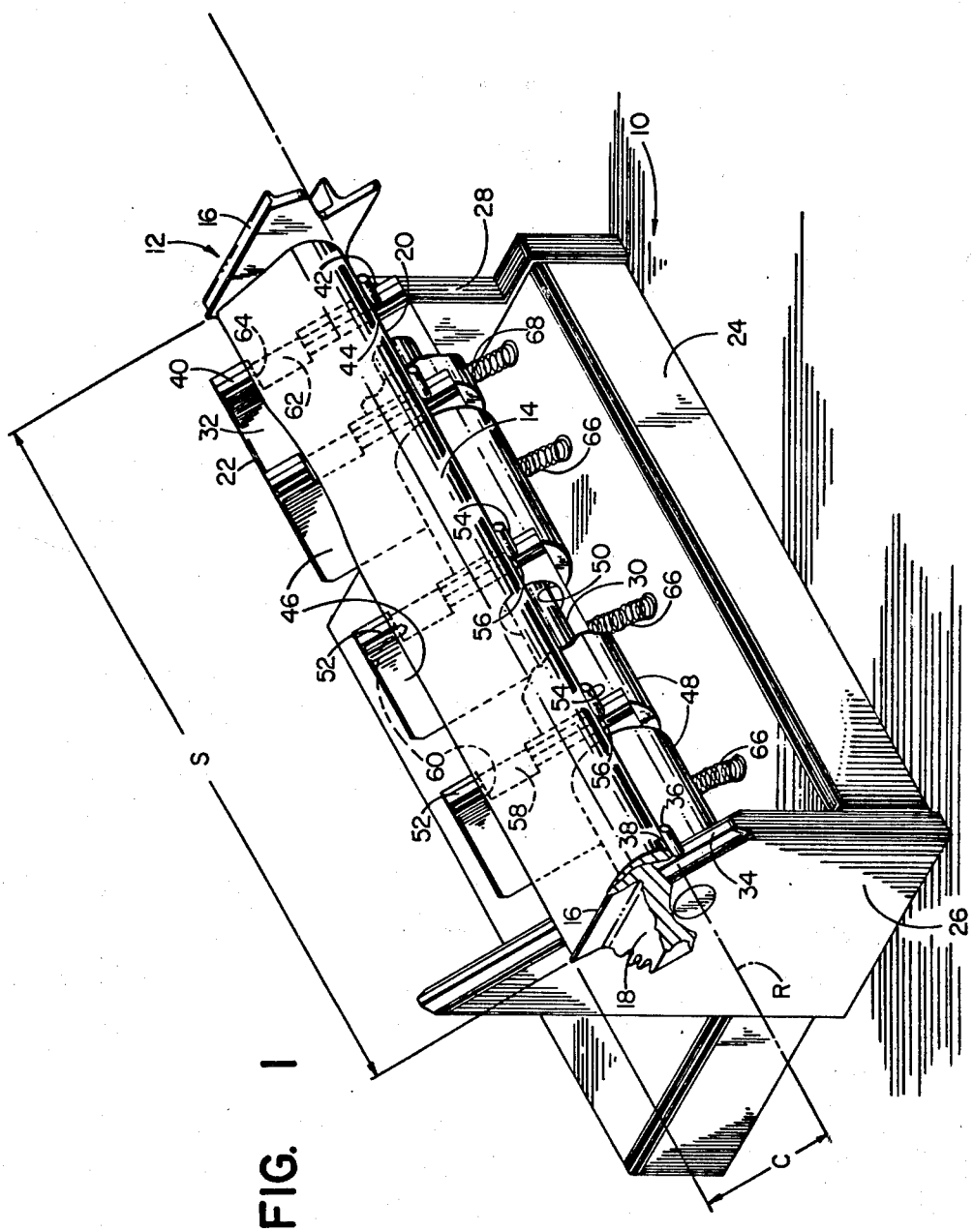
FIG. 1 is a perspective view of the chord measurement gauge with portions broken away to reveal features thereof.

The invention is described hereafter with respect to the best mode as illustrated by FIG. 1. The minimum chord gauge 10 is adapted for measurement of chord length at various sections along the turbine blade 12. The blade itself is formed of an airfoil section 14, end platforms 16 and a root attachment section 18. The length of the airfoil section of the blade is referred to as span (S) and the width of the blade is referred to as chord (C). Chord length is measured along a straight line from the leading edge 20 to the trailing edge 22 of the airfoil section.

The gauge 10 itself is formed of a base plate 24 and a pair of end plates identified as a first end plate 26 and a second end plate 28. The end plates extend upwardly from the base plate and are parallel to one another. A spindle 30 extends perpendicularly between the base plates. A rotatable gauge plate 32 is on the spindle in proximity to the second end plate and is rotatable in a plane perpendicular to the spindle. The first end plate has a top edge 34. A pin 36 extends upwardly from the top edge to form a "V" stop 38 at the point of intersection of a mutually perpendicular line drawn from the axis of the spindle to the top edge. Similarly, the rotatable gauge plate has a top edge 40. A pin 42 extends upwardly from the top edge to form a "V" stop 44 at the point of intersection of a mutually perpendicular line drawn from the axis of the spindle to to the top edge of the rotatable gauge plate. The "V" stops 38 and 44 are equidistant from the axis of the spindle such that a reference line R drawn therebetween is parallel to the axis of the spindle. The reference line R is approximately coincident with the leading edge of the airfoil placed in the gauge for measurement. The leading edge need only be coincident, however, at the "V" stops 38 and 44.

A plurality of floating gauge plates 46 are disposed at intermediate points along the spindle 30 between the rotatable gauge plate 32 and the first end plate 26. The floating plates are separated by cylindrical spacers 48. The spacers hold the floating plates at fixed locations along the span of the airfoil, and in perpendicular relationship to the spindle 30. The plates are resultantly perpendicular to the axis of the spindle and reference line R. The spindle passes through holes 50 in the floating plates. The holes are of larger diameter than the diameter of the spindle to permit planar movements of the floating plates.

Each floating plate has top edge 52. A pin 54 extends upwardly from the top edge to such a "V" stop 56 at the point of intersection of the pin with the top edges. Each floating plate further has means, such as the notch 58, for indicating a known length from the pin along the top edge of the floating plate. As illustrated, the notch is set into the top edge with the outward edge 60 of the notch marking the minimum required chord length to be measured. Similarly, a notch 62 is set into the top edge of the rotatable gauge plate 32 with the outer edge 64 of the notch marking the minimum required chord length to be measured.

Springs 66 extending from the base plate 24, one each into engagement with a corresponding floating plate 46, bias the plates upwardly and rotatably into engagement with the airfoil to be measured. A spring 68 bias the rotatable plate into engagement with the airfoil.

Figure 2:
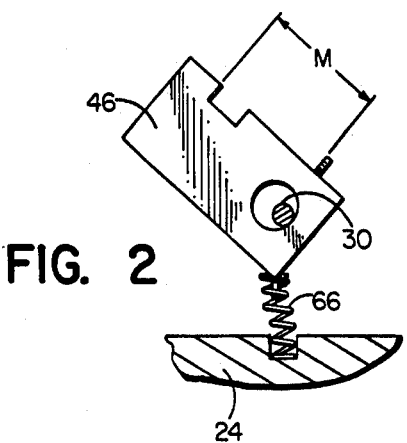
FIG. 2 is an illustration of one of the floating plates at rest in a position biased against the spindle.
Figure 3:
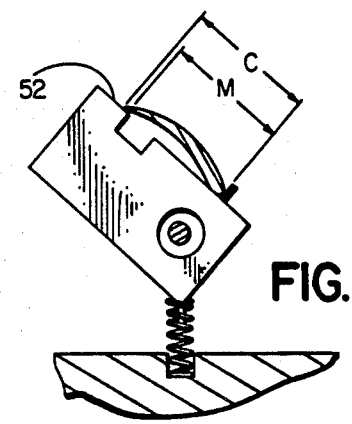
FIG. 3 is an illustration of one of the floating plates as engaged by an airfoil section of acceptable chord length.
Figure 4:
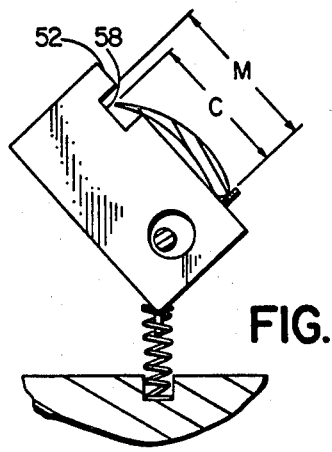
FIG. 4 is an illustration of one of the floating plates as engaged by an airfoil section of unacceptable chord length.

As is illustrated in FIG. 2, each floating plate 46 is biased upwardly from the base plate 24 and rotatably about the spindle 30 by the associated spring 66. As the airfoil to be measured is brought into engagement with the "V" stop 38 of the first end plate and the "V" stop 44 of the rotatable gauge plate 32, the leading edge engages each of the "V" stops 56. Such engagement is illustrated in FIG. 2. If the chord length (C) of the airfoil section being measured is greater than the minimum length (M), the trailing edge 22 of the airfoil rests on the top edge 52 of the plate. If the chord length (C) of the airfoil section being measured is less than the minimum length (M), the trailing edge becomes depressed into the notch 58 as illustrated in FIG. 3.

Referring again to FIG. 1, it can be seen that the minimum chord length is measured simultaneously at a plurality of sections along the span (S) of the airfoil. As illustrated, the chord length of the airfoil is acceptable at all sections measured with exception of the section of the floating plate most near the rotatable gauge plate 32.

In recognition of a principal advantage, it should be noted that the leading edges of the blade sections need not fall on the reference line (R). Deviations in the leading edge from the design condition, or the as manufactured condition, do not enter into local chord length measurement. This is particularly important in the inspection of used airfoils being evaluated for possible repair or remanufacture.

Although this invention has been shown and described with respect to a preferred embodiment, it will be understood by those skilled in the art that various changes in form and detail thereof may be made without departing from the spirit and scope of the claimed invention.

I claim:

1. A gauge for measuring the minimum chord length of an airfoil at intermediate points along the span thereof, comprising:
   a base plate;
   a first end plate extending upwardly from the base plate, and having a top edge;
   a second end plate extending upwardly from the base plate and parallel to the first end plate;
   a spindle extending between said end plates along an axis which is perpendicular thereto;
   a rotatable gauge plate mounted perpendicularly on said spindle in proximity to the second end plate and having a top edge;
   a pin extending upwardly from the top edge of the first end plate to form a "V" stop at a point of intersection of a mutually perpendicular line drawn through the axis of the spindle to the top edge of the plate;
   a pin extending upwardly from the top edge of the rotatable gauge plate to form a "V" stop at a point of intersection of a mutually perpendicular line drawn through the axis of the spindle to the top edge of the plate;
   at least one floating gauge plate disposed along the spindle at a position intermediate of the first end plate and the rotatable gauge plate wherein the floating gauge plate has a top edge and is movable in a plane perpendicular to the spindle;
   a pin extending upwardly from the top edge of the floating plate; and
   means for indicating the length of minimum acceptable chord length measured along the top edge of the floating plate in a direction away from the floating plate pin.

2. The invention according to claim 1 having a plurality of said floating gauge plates.

3. The invention according to claim 2 which further has spacers disposed along the spindle to hold the gauge plates at known positions along the spindle and to guide the plates in perpendicular planar movement with respect to the spindle.

4. The invention according to claim 1 wherein said means for indicating chord length is a notch at the top edge of each of the floating plates.

5. The invention according to claim 3 wherein said means for indicating chord length is a notch at the top edge of each of the floating plates.

6. The invention according to claim 1 wherein said rotatable gauge plate has means for indicating the length of minimum acceptable chord length measured along the top edge of the rotatable plate in a direction away from the rotatable plate pin.

7. The invention according to claim 6 wherein each of said means for indicating chord length is a notch at the top edge of the respective plate.

8. The invention according to claim 2 which further includes a spring at each of said plates and adapted to bias the corresponding plate upwardly and rotatably into engagement with the airfoil to be measured.

9. The invention according to claim 4 which further includes a spring at each of said plates and adapted to bias the corresponding plate upwardly and rotatably into engagement with the airfoil to be measured.

10. The invention according to claim 6 which further includes a spring at each of said plates and adapted to bias the corresponding plate upwardly and rotatably into engagement with the airfoil to be measured.

11. The invention according to claim 7 which further includes a spring at each of said plates and adapted to bias the corresponding plate upwardly and rotatably into engagement with the airfoil to be measured.

* * * * *